Dec. 21, 1937.   C. G. SEYFERTH   2,102,821
COUPLING DEVICE FOR TRAILERS AND TRACTORS
Filed Sept. 29, 1934   2 Sheets-Sheet 1
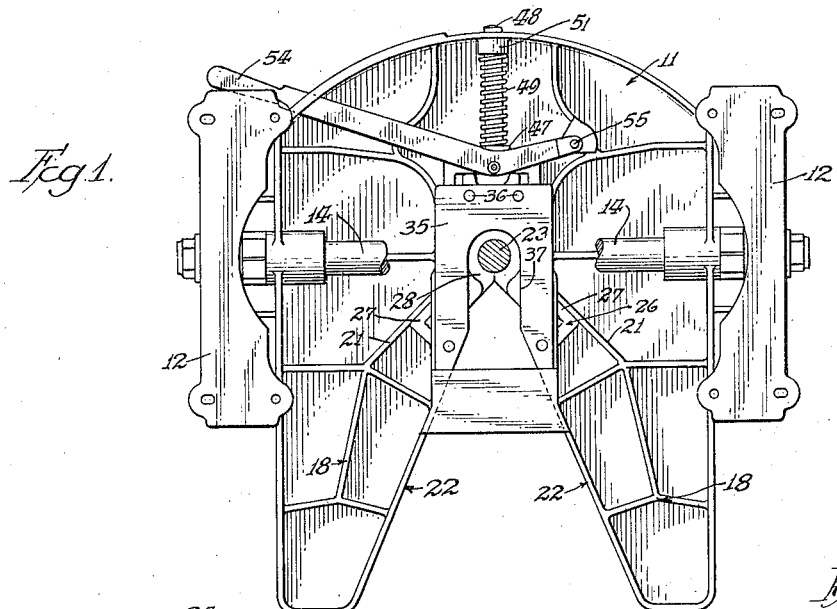
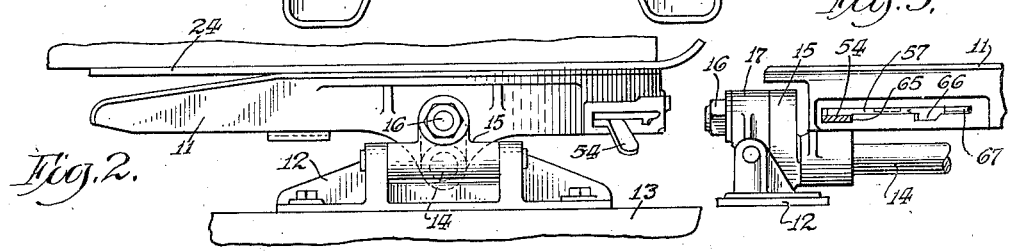
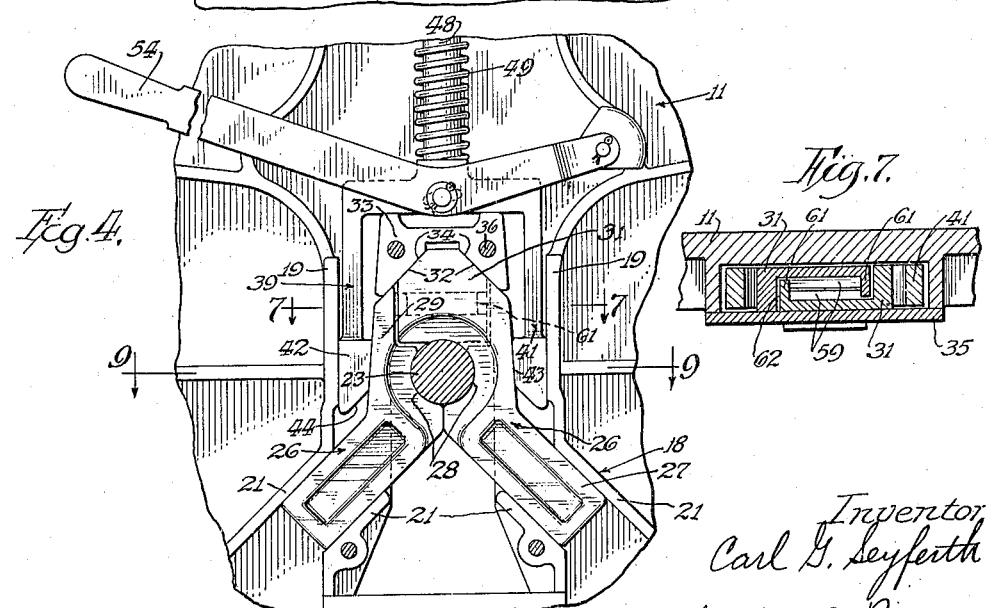
Inventor
Carl G. Seyferth
Charles B. Rasmussen
Atty.

Dec. 21, 1937.   C. G. SEYFERTH   2,102,821
COUPLING DEVICE FOR TRAILERS AND TRACTORS
Filed Sept. 29, 1934   2 Sheets-Sheet 2
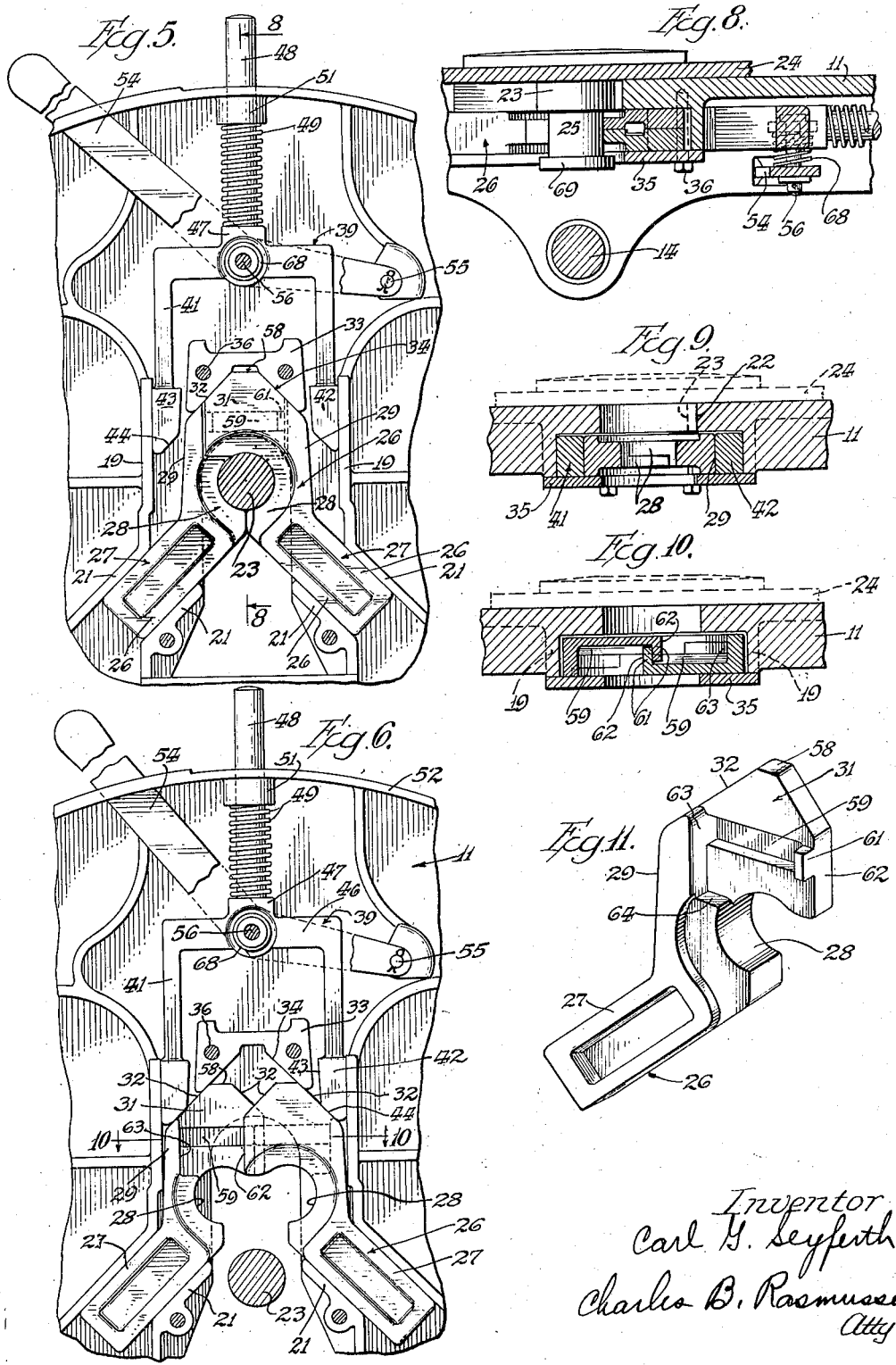

Patented Dec. 21, 1937

2,102,821

UNITED STATES PATENT OFFICE 2,102,821

COUPLING DEVICE FOR TRAILERS AND TRACTORS

Carl G. Seyferth, Muskegon, Mich., assignor to West Michigan Steel Foundry Co., Muskegon, Mich., a corporation of Michigan Application September 29, 1934, Serial No. 746,207

12 Claims. (Cl. 280—33.1)

This invention relates to coupling means for connecting a trailer and a tractor vehicle with each other and has more particular reference to improvements in a type of construction known as a fifth wheel.

A principal object of the invention is the provision of a novel floating type of jaw construction which is mounted upon the tractor and which is adapted to retain and lock the king pin element of a trailer automatically together upon the establishment of correct operative relation between the two vehicles.

Another important object of the invention is the provision of an improved type of means for more effectively operating the floating jaw elements in coupling means of this character into a released or open position corresponding to the position when the king pin element is withdrawn, and to more positively maintain this open position until such time as the king pin element may be introduced to effect a locking position between the tractor and trailer vehicle.

A further object of the invention is the provision of a coupling means between trailer and tractor of an improved type of jaw construction wherein releasing or locking action is imparted positively and simultaneously to both jaw elements, and wherein means are provided for coordinating the action of these jaw elements to effectively and positively limit their extreme motions, these motions corresponding to releasing and locking positions.

A still further important object of the invention is the provision of a coupling between a tractor and a trailer wherein a manual controlling element is adapted to be locked in either released position or locking position.

Numerous other objects and advantages of the invention will be apparent as it is better understood from the following description, which, taken in connection with the accompanying drawings, discloses a preferred embodiment thereof.

On the drawings,

Figure 1 is a bottom plan view of the fifth wheel construction shown in a coupled position and with the cover plate attached;

Fig. 2 is a side elevation of Fig. 1;

Fig. 3 is a fragmentary front elevation, viewed from the right of Fig. 2;

Fig. 4 is a fragmentary bottom plan view, similar to Fig. 1, but enlarged and with the cover plate removed;

Fig. 5 is a fragmentary bottom plan view showing the position of the parts prior to withdrawal of the king pin and with the sliding yoke locked in released position;

Fig. 6 is a view, similar to Fig. 5, showing the king pin withdrawn and the parts locked in a completely released position;

Fig. 7 is a section taken substantially on the line 7—7 of Fig. 4;

Fig. 8 is a section taken substantially on the line 8—8 of Fig. 5;

Fig. 9 is a section taken substantially on the line 9—9 of Fig. 4;

Fig. 10 is a section taken substantially on the line 10—10 of Fig. 6; and

Fig. 11 is a perspective view of one of the floating jaws.

Referring to the drawings, reference character 11 indicates a lower fifth wheel member or tractor plate supported on the body of a tractor vehicle (not shown) by means of brackets 12 which are bolted or otherwise secured to the upper surface of the body or frame of a tractor vehicle 13, and which carry supporting cross shaft or axle 14 of the tractor plate through links 15, each connected at its upper end to a pivot pin 16 journalled in the bearings 17 carried by the brackets 12, and connected at its lower end to the plate supporting cross shaft or axle 14.

The plate 11 is provided on its under face with a plurality of reinforcing ribs 18, some of which extend vertically and parallel to each other as at 19 while others extend in an angular direction and parallel to each other as at 21.

The rear portion of the plate 11 is provided with a flared opening 22 into which a king pin 23 of the upper fifth wheel member 24 carried by the trailer vehicle (not shown) may be introduced for connection with the tractor plate 11.

The king pin 23 is carried by the upper fifth wheel member of the trailer and is provided between its ends with a diametrically smaller annular neck portion 25 about which the jaw locking elements, to be later described, are adapted to engage for maintaining the proper locking relation between the pulling vehicles or tractor and the trailer.

For the purpose of maintaining the king pin 23 locked in operative position with respect to the tractor plate 11, a pair of locking jaws 26 are provided, which comprise angular portions 27 adapted to slide between the ribs 21, complementary arcuate clamping faces 28 adapted to embrace the neck portion 25 of the king pin, slightly flaring cam edges 29 on either side of the clamping faces 28, and undercut and overlying portions 31 positioned forwardly of the king pin, each overlapping portion being provided with a pair of converging edges 32, opposite edges being parallel to the edges of the angular portion 27 and forming a continuation of the slightly flaring cam edges 29. Disposed forwardly of the jaw elements is a fixedly mounted guide member 33 having a pair of converging edges 34 co-operating, by sliding contact, with the converging edges 32 of the jaw elements 26.

Both of the jaws and the guide member are mounted between the under side of the tractor plate 11 and a cover plate 35 fastened securely to the tractor plate by bolts 36, a plurality of these bolts serving to rigidly mount the guide member 33. The cover plate 35 serves to retain the jaw elements in proper horizontal position and is provided with a cut away portion 37 allowing for admittance of the king pin.

In order to maintain the jaw elements in clamping position, jaw locking means are disposed on the lower face of the tractor plate 11, together with mechanism for manually withdrawing said jaw locking means from locking position.

The jaw locking means comprises a yoke member, generally indicated at 39, slidably mounted between the lower face of the tractor plate 11 and the cover plate 35, and having legs 41, the free ends of which are provided with wedge shaped enlargements 42 adapted for insertion between the parallel ribs 19 which form guides therefor.

The wedges 42 are provided with inclined surfaces or faces 43 for co-operation with the correspondingly inclined surfaces 29 on the jaw elements 26 and converging surfaces 44 for co-operation with the correspondingly converging surfaces 32 on the overlapping portions 31 of the jaw elements.

The yoke member is normally urged into locking registration with the jaw elements by means of a transverse portion 46 on the yoke member which is provided with an enlargement 47 having an extension in the form of a guide stem 48 surrounded by a coiled spring 49 and which extends slidably through an opening in a boss 51 of a forwardly depending flange 52 of the tractor plate 11, the spring 49 being compressed between boss 51 and the enlarged portion 47.

Manual means for effecting the withdrawal of the yoke member into a released position is provided and comprises a lever 54 pivotally secured at one end by means of a pin 55 to the tractor plate 11 on the lower face thereof and pivotally connected intermediate its ends to the enlargement 47 of the yoke by means of a pin 56. The free or outer end of the lever 54 projects through an elongated slot 57 provided in the circumferential flange 52 of the tractor plate.

In the locking position shown in Fig. 4 it will be noted that the wedges 42 of the yoke 39 have been advanced into the passages between the parallel ribs 19 and the inclined surface 29 of the jaw elements, and that action of the spring 49 continuously urges the yoke into the position shown. The frictional contact between the wedges and the jaw elements tends to maintain the jaw element in the clamped position about the king pin, and displacement of any of these members from their locking position is further prevented by the pull of the king pin which tends to more securely bind these members in locking relation.

Upon withdrawal of the yoke from the locking position in Fig. 4 to the released position shown in Fig. 5 the locking jaw elements are free to move along their angular axes, and when longitudinal movement of the tractor vehicle relatively to the trailer takes place, the king pin 23 will exert a spreading action upon the locking jaws causing them to move away from one another into the spaces created by the withdrawal of the yoke and along their angular axes in the parallel ribs 21 and into the released position shown in Fig. 6, whereby a passage is created between the inner faces of the locking jaws wide enough to permit the king pin 23 to move out between the same and release the trailer from the tractor vehicle.

This movement of the jaw elements guided by the channels formed by the ribs 21 causes the overlapping portions 31 to move outwardly until their converging edges 32 are forced into frictional engagement with the wedge surfaces 44 of the yoke, thus causing the entire yoke and lever assembly to move against the normal action of the spring 49 from the position shown in Fig. 5 to the position shown in Fig. 6.

Owing to the frictional engagement of the yoke with the jaw elements and the influence of spring 49, the jaws remain in an open position and in readiness to again receive the king pin of the trailer when it is desired to re-establish connection between the trailer and the tractor.

In order to unify the spreading action of the jaws 26 from the locking position shown in Fig. 4 to the fully released position shown in Fig. 6, the two locking jaws are operatively interconnected so that the movement of one of said jaws will induce and insure a corresponding movement of its companion jaw.

This interconnection in the present form is effected indirectly by the guide member 33 previously mentioned and directly by means located on the overlying portions 31 of the jaw elements 26. From a consideration of Fig. 11 it will be noted that the overlying portions 31 are of approximately one-half the thickness of the main portion of the jaw element, these portions being adapted to overlie one another so that they lie in different planes and slide freely over each other on their presented faces. Intermediate the clamping face 28 and the end 58 of the overlying portion 31 is an undercut recess 59 having at one end thereof an abutment 61 flush with the end surface 62. The undercut recess extends perpendicularly from this abutment to within a short distance of the inclined surface 29 at 63.

The presented surface of the overlying portion 31 extends slightly beyond the forward portion of the arcuate clamping face 28 at 64 from which point the jaw retains its full thickness. It will be noted that both jaws are identical in form and size with their overlying portions superimposed upon one another.

It will be seen, viewing Figs. 5 and 7, that upon the withdrawal of the king pin the jaw elements will be forced to spread outwardly and at the same time rearwardly, and in so doing will cause the abutments 61 to move in the co-acting recesses 59, thus preventing any acceleration or retardation of one jaw relatively to the other. The jaws are constrained in this manner until they reach the fully released position shown in Fig. 6, at which time the abutments will contact each other as shown in Fig. 10 preventing further movement of the jaws.

It will be apparent that upon the introduction of the king pin into the opening provided between the operative arcuate clamping faces of the jaw element when the latter have been moved to release position, the king pin will encounter both overlying portions 31 simultaneously causing both jaws to move forwardly and inwardly, their forward ends being guided by the member 33. As the jaws move forwardly the abutments move away from each other and moving in their respective recesses restrict the jaw elements to move in unity into king pin locking position.

Referring now to the lever 54, it will be seen (viewing Fig. 3) that the end of the lever projects through the circumferential slot 57 of the tractor plate, this slot being formed with spaced recesses whereby the lever is locked against accidental displacement from either locking or release positions.

These recesses are indicated at 65 and 66, Fig. 3. The recess 65 is provided to lock the lever in jaw closing position. When it is desired to uncouple the vehicles, the lever 54 is manually moved from the recess 65 into the recess 66 which maintains the yoke in the released position shown in Fig. 5.

Upon separation of the vehicles, the jaws open contacting the wedges on the yoke, forcing the yoke against the tension of the spring 49 and moving lever 54 out of recess 66 and into the extreme right hand end 67 of slot 57 as viewed in Fig. 3.

The lever 54 is locked against accidental displacement from either position and is maintained in either of these recesses by a compression spring 68 (Fig. 8) surrounding the connector pin 56 of the lever, the connector pin being attached to the yoke by the transverse member 46.

Since the spring 68 is interposed between the yoke and the lever, the latter is urged downward on the pin 56 and is also urged to enter the locking recesses 65 and 66 of the slot 57 in which the lever is movable.

It is thought that the operation of the device will be fully understood from the foregoing description. When the trailer is disconnected from the tractor vehicle the locking jaw elements 26 are maintained in the position shown in Fig. 6 because of the yielding frictional engagement of the wedges 42 of the yoke against the jaw elements. In this position the lever 54 is maintained in the extreme right hand end 67 of the slot 57 as is shown in broken lines in Fig. 3.

When it is desired to establish connection between the vehicles, the tractor is moved towards the trailer so that the king pin 23 enters between the jaws 26. The king pin strikes the rear end of the overlying portions 31 and forces the jaws rearwardly and at the same time inwardly or towards each other, while the converging surfaces 32 are guided by the member 33. The jaws in their inward motion free the yoke wedge ends allowing the yoke, under influence of the spring 49, to immediately advance into jaw locking position, shown in Fig. 4. At the same time the movement of the sliding yoke into jaw locking position moves the locking lever 54 from the position shown in Fig. 6 to the position shown in Fig. 4. The movement being sudden, the lever passes by the locking recess 66 until it reaches the end of the slot 57 when the influence of the spring 68 urges the lever into the locking recess 65.

In this manner the locking engagement for the jaws is completed. The wedge shaped portion 42 of the sliding yoke 41 prevents the outward spreading of the jaws and the abutments 61 within the recess 59 prevent any longitudinal movement of the jaw elements towards a released position. The lever 54 is firmly seated in the locking recess 65 to prevent its accidental movement in the slot 57.

Viewing Fig. 8, it will be noted that an enlarged annular flange 69 upon the lower end of the king pin and adjacent the reduced portion 25 serves to prevent vertical displacement of the king pin, yet allowing, within working limits, some freedom of movement of the king pin vertically as required during the use of the coupled vehicles.

It is thought that the invention and many of its attendant advantages will be apparent from the foregoing description and that various changes may be made in the form, construction and arrangement of the parts without departing from the spirit and scope of the invention or sacrificing all of its material advantages, the form hereinbefore described being merely a preferred embodiment thereof.

I claim:

1. In a coupling device for a trailer and tractor vehicle having a plate member on one vehicle and a pin on the other vehicle, a pair of floating jaw members mounted on said plate for pure translational movement relative thereto and to each other and adapted to retain and lock said pin upon the establishment of correct operative relation between the two vehicles, and stationary means mounted on the under side of said plate for positively guiding said floating jaws in their movements to and from pin retaining position, comprising ribs engaging one end of each of said jaws and a guide member engaging the other end thereof.

2. In a coupling device for a trailer and tractor vehicle having a plate member on one vehicle and a pin on the other vehicle, a pair of floating jaw members mounted on said plate and adapted to retain and lock said pin upon the establishment of correct operative relation between the two vehicles, and sliding means adapted to engage the outer surfaces of said floating jaws to lock the same in pin engaging position.

3. In a coupling device for a trailer and tractor vehicle having a plate member on one vehicle and a pin on the other vehicle, a pair of floating jaw members mounted on said plate and adapted to retain and lock said pin upon the establishment of correct operative relation between the two vehicles, means mounted on the under side of said plate for guiding said floating jaws in their movement to and from pin retaining position, and a sliding yoke having wedge-shaped end members for engaging the outer surfaces of said floating jaws to lock the same in pin retaining position.

4. In a coupling device for a trailer and tractor vehicle having a plate member on one vehicle and a pin on the other vehicle, a pair of floating jaw members mounted on said plate and adapted to retain and lock said pin upon the establishment of correct operative relation between the two vehicles, means mounted on the under side of said plate for guiding said floating jaws in their movement to and from pin retaining position, and a sliding yoke having wedge-shaped end members for engaging the outer surfaces of said floating jaws to lock the same in pin retaining position, said wedge-shaped end members having additionally inclined end surfaces adapted to be engaged by inclined ends of said floating jaws in the movement of said jaws from pin retaining position.

5. In a fifth wheel coupling device, a jaw member having a king pin retaining recess in one side of the main body thereof, a slightly tapered surface comprising the opposite side of said main body and an end portion comprising a parallelepiped with its longitudinal axis inclined to the longitudinal axis of the main body and with one surface thereof merging with said tapered surface.

6. In a coupling device for a trailer and tractor vehicle having a plate member on one vehicle and a pin on the other vehicle, a pair of floating jaw members adapted to be moved by said pin and mounted on said plate for pure translational movement only relative thereto and to each other and adapted to retain and lock said pin upon the establishment of correct operative relation between the two vehicles, and means adapted to slidingly engage said floating jaw members in the plane of movement thereof to lock the same in pin retaining position.

7. In a coupling device for a trailer and tractor vehicle having a plate member on one vehicle and a pin on the other vehicle, a pair of floating jaw members mounted on said plate and adapted to retain and lock said pin upon the establishment of correct operative relation between the two vehicles, and means tending to maintain said floating jaws in pin receiving position when in one position and for locking said floating jaws in pin engaging position when in another position by slidingly engaging the outer surfaces of said jaws.

8. In a coupling device employing male and female members, a connecting element associated with one of said members, and a pair of floating jaw members associated with the other of said members and mounted thereon for sliding movement only relative thereto and to each other, said jaw members being movable by said connecting element to engage and positively lock the same in coupled position.

9. In a coupling device employing male and female members adapted to be automatically engaged with each other, a connecting element associated with one of said members, and a pair of jaw members having arcuate recesses for automatically embracing and locking said connecting element in coupled position and mounted upon the other of said members for pure translational movement relative thereto and to each other.

10. In a coupling device for a trailer and tractor vehicle having a plate member on one vehicle and a pin on the other vehicle, a pair of floating jaw members adapted to be moved by said pin and mounted on said plate for pure translational movement relative thereto and to each other and adapted to retain and lock said pin upon the establishment of correct operative relation between the two vehicles, and means for positively locking said jaw members in pin retaining position.

11. In a coupling device for a trailer and tractor vehicle having a plate member on one vehicle and a king pin on the other vehicle, a pair of floating jaw members adapted to be moved by horizontal movement of said king pin to engage and positively lock the king pin, said jaw members being mounted upon said plate for pure translational movement only relative thereto and to each other.

12. In a coupling device for a trailer and tractor vehicle having a plate member on one vehicle and a king pin on the other vehicle adapted to be automatically engaged with each other, a pair of floating jaw members having arcuate recesses for automatically embracing and positively locking said king pin and mounted upon said plate for pure translational movement only relative thereto and to each other.

CARL G. SEYFERTH.